3,396,476
MEANS AND METHOD OF CONTROLLING
DEHYDRATORS
Raymond O. Eaves, Brawley, Calif., assignor to Batley-Janss Enterprises, Brawley, Calif., a corporation of California
Filed Mar. 13, 1967, Ser. No. 622,581
10 Claims. (Cl. 34—25)

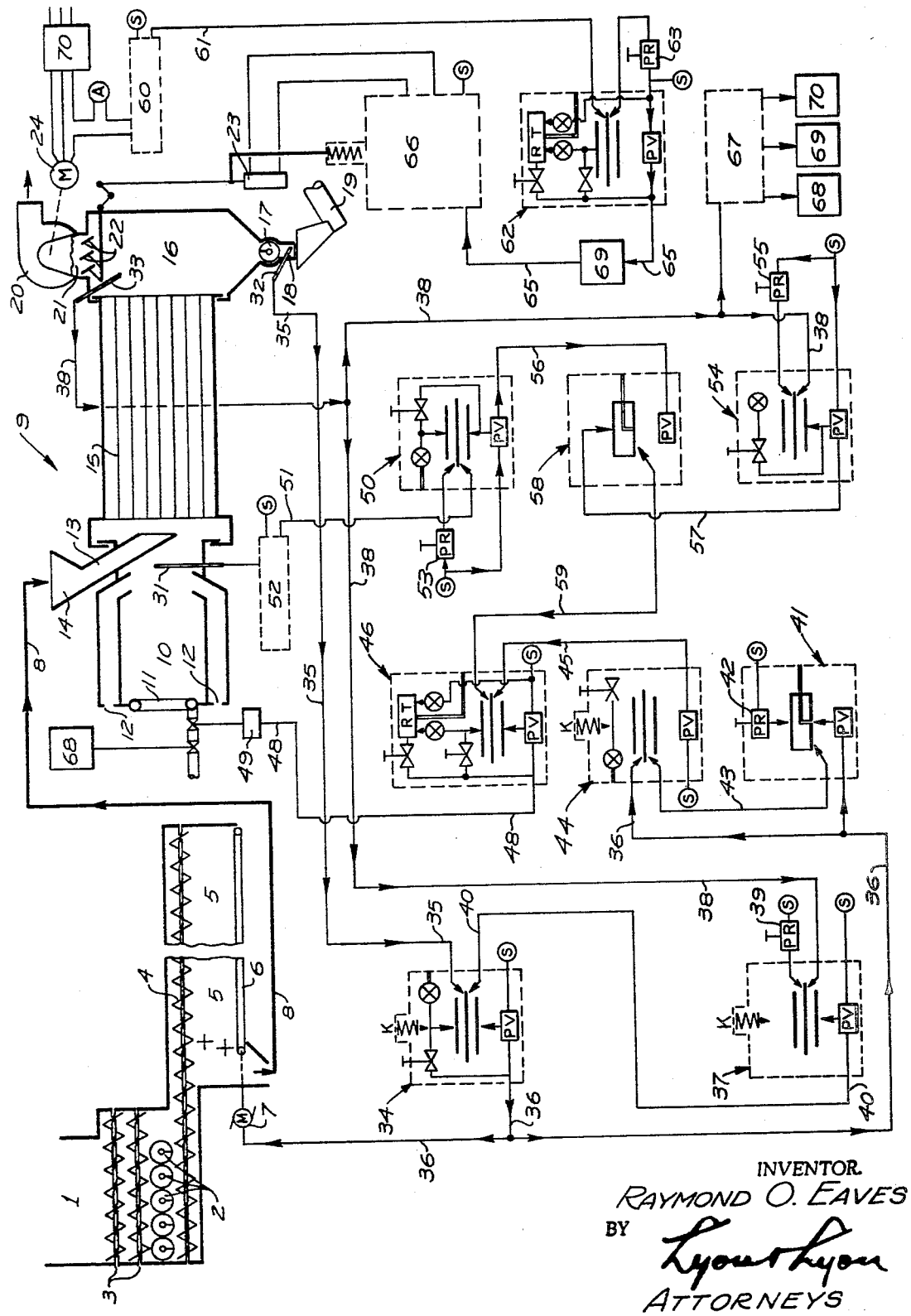

ABSTRACT OF THE DISCLOSURE

A control system for dehydrators by which the air discharge temperature and discharge temperature of the product being dehydrated are measured to control the feed rate of the material being dehydrated, while under normal conditions, the furnace temperature remains constant.

Background of invention

The means and method herein presented is intended primarily for dehydrating alfalfa preparatory to being pelletized. It is highly desirable that the alfalfa be pelletized as soon as possible after harvest in order to retain the maximum percentage of certain nutrients. During the growing season, which in some localities may be throughout the year, a steady supply of alfalfa is cut and delivered to the dehydrating plant in such a manner that a continuous supply is maintained. The dehydrator is operated continuously, yet a minimum amount of storage is maintained to reduce to a minimum the elapsed time between harvest and delivery into the dehydrator.

The dehydrator, except for the means and method of control, is conventional and comprises a rotary dryer which receives the alfalfa in one end which is exposed to heat from a furnace and separately discharges the dehydrated alfalfa and air from the other end. The alfalfa passes immediately to one or more grinding machines and then to pelletizing machines.

The moisture content of the alfalfa as received varies substantially, yet it is necessary that the remaining moisture content of the dehydrated alfalfa remain essentially constant. In the exercise of the present invention, the furnace is, under normal conditions, maintained at an essentially constant temperature. The temperature of the air within the discharge end of the dehydrator and the temperature of the discharging alfalfa, which is indicative of the moisture content, are sensed and caused to operate computing controllers which in turn increase or decrease the rate at which the raw alfalfa is supplied to the dehydrator.

In addition, an exhaust blower at the discharge end of the dehydrator is provided with a damper and the load on the exhaust blower is sensed and caused to control the damper to maintain a constant load and thus maintain a constant mass of air, or more correctly, a constant mass of gas comprising air and water vapor, moving through the discharge blower. Thus for any average rate of feed selected so as to maintain continuous supply of alfalfa, both the furnace temperature and air mass flow are maintained as constant factors rather than variable factors.

It is, therefore, among the objects of this invention, to provide:

First, a means and method of controlling a dehydrator handling material of varying moisture content wherein the supply of heat and the discharge of air is maintained constant, while the rate of feed of the material is varied in accordance with the change in temperature of the air and the dehydrated material at the discharge end of the dehydrator; that is, relatively wet material is fed at a slower rate than relatively dry material to satisfy the condition of a constant air temperature and material discharge temperature.

Second, a means and method wherein during transition, such as during starting or closing periods, the furnace temperature is respectively increased or decreased in accordance with the increasing or decreasing supply of material.

Third, a means and method which, in the handling of combustible material, inherently provides a safety control adapted to shut off the fuel supply and close air discharge dampers should the air discharge temperature rise toward an unsafe level, thereby smothering and confining any flame that might develop; the apparatus being adapted to resume control when the unsafe condition is eliminated.

Description of the drawing

The figure is a diagrammatical view of the dehydrator and the means of controlling the dehydrator.

Specification

The dehydrator herein illustrated is particularly designed for the dehydration of alfalfa. The alfalfa, or other material to be dehydrated, is received from a conveyor system more fully set forth in my companion patent application, Ser. No. 622,556 filed Mar. 13, 1967. The conveyor system includes a receiving bin 1, at the bottom of which are longitudinal conveyors 2. Mounted midway between the ends of the longitudinal conveyors are one or more transversely extending dividing conveyors 3. These move the material, as it approaches the central portion of the receiving bin, into an extension located at one lateral side. Also at the center of the receiving bin, and located under the longitudinal conveyors 2, is a pair of delivery conveyors 4, which extend laterally beyond the receiving bin. The delivery conveyors receive the material from both the conveyors 2 and 3. The delivery conveyors extend a substantial distance beyond the receiving bin over a collecting bin 5, having a bottom feeder 6 therein. The bottom feeder may be a belt or a series of chain connected bars.

The delivery conveyors 4 move to the right as indicated in the figure, whereas the bottom feeder 6 moves to the left. As a consequence, the material drops from the delivery conveyors and progressively fills the entire space between the bottom feeder and the delivery conveyors. The bottom feeder is driven by a variable speed feed motor 7. The material discharged from the bottom feeder is picked up by conventional elevating conveyor 8 and carried to the dehydrator, designated generally by 9.

The dehydrator includes a furnace chamber 10, having a burner 11 at one end and appropriate air inlets 12. A material inlet tube 13 extends downwardly into the discharge end of the furnace chamber. The upper end of the inlet tube is provided with a suitable funnel 14 or other receiver arranged to receive all of the material delivered by the elevating conveyor 8.

The furnace chamber communicates with the inlet end of a rotary drying drum 15 into which the heated air and the material to be dehydrated is fed. The contents of the drying drum 15 discharge into a separating chamber 16 at the bottom of which is a material discharge conveyor 17, terminating in an outlet spout 18, which delivers the dehydrated material to an elevating conveyor 19 for further processing.

A blower 20 is located at the upper end of the separating chamber 16 and includes an inlet 21, in front of which is provided a series of damper vanes 22. A reciprocable hydraulic or pneumatic power unit 23 controls the position of the damper vanes. A motor 24 drives the blower 20.

The dehydrator may be considered as conventional although some modification has been made to adapt it to the control means and to the method of control, which is the subject of this invention.

In the exercise of the present invention, a furnace temperature sensor 31 is located at the discharge end of the furnace chamber 10, that is at the inlet end of the rotary drying drum 15. A material discharge temperature sensor 32 is located at the outlet spout 18 or otherwise located so as to be in physical contact with the discharging dehydrated material so as to reflect the temperature of the material. An air discharge temperature sensor 33 is located in the upper end of the separating chamber 16 so as to reflect the temperature of the discharging air and water vapor.

A pneumatic control system using conventional components has been adapted to the purposes of the control means and the various control valves comprising the pneumatic control system have been indicated diagrammatically. In the diagrammatical representations of various components, initials are used as follows: S is the source of the air used in the control system; PV is pilot valve; PR is pressure regulator; RT is reset timer.

The control means includes a primary feed motor controller 34, having an input line 35 supplied from the material discharge sensor 32. An output line 36 extends from the controller 34 to the feed motor 7.

A secondary feed motor controller 37 is provided with an input line 38 extending from the air discharge temperature sensor 33. The controller 37 is provided with a second input line from a pressure regulator 39. The regulator is manually adjustable and, as will be brought out hereinafter, its adjustment determines indirectly the moisture content of the material discharged from the dehydrator. An output line 40 communicates with the primary controller 34 so that the pressure in its output line 36 is determined by the pressures in lines 35 and 40.

A high limit relay 41, which limits the maximum value of the output pressure, has an input connected to the line 36, and also an input connected with the standard pressure source which acts through a pressure regulator 42 in opposition to the pressure in the line 36. The pressure from line 36 is applied through the relay unchanged until it reaches the maximum limit for which it is set. The output line 43 transmits the pressure to a furnace temperature limiting controller 44. Pressure from line 36 is also applied to the controller 44. The resulting pressure is applied through the output line 45 to a primary furnace temperature controller 46. The controller 46 is connected by an output line 48 to a furnace burner control valve 49.

A furnace temperature responder 50 is provided, connected by an input line 51 to a transducer 52 to the furnace temperature sensor 31. The responder 50 is connected to a second input line connected with the standard pressure source and having a pressure regulator 53 capable of manual adjustment. Adjustment of the regulator 53 has the effect of selecting the temperature maintained in the furnace.

The air discharge temperature sensor 33 is connected to an air discharge temperature responder 54, which is also connected to the standard pressure source through a manual pressure regulator 55, the adjustment of which has the effect of controlling the temperature of the air discharging from the chamber 16, and an output line 56 from the furnace temperature responder 50 and an outlet line 57 from the air discharge temperature responder 54 communicate with a selector 58 arranged to select the lower of two pressures. The selected lower pressure is applied through an output line 59 to the primary furnace temperature control 46.

The blower motor 24 is provided with a load sensor and transducer 60, the output pressure of which is applied through an output line 61 to a positioner control 62. The positioner control also communicates with the standard source through a manual pressure regulator 63. The output line 65 from the positioner control 62 applies pressure to a positioner 66 for the power unit 23, which positions the damper vanes 22.

The output line 38, from the air discharge temperature sensor also communicates with a pressure sensing relay 67, which is activated when the temperature exceeds a predetermined value. The relay 67, when energized, closes cut-off valves or switches 68, 69 and 70, connected respectively to the fuel line leading to the furnace burner 11, to the positioner 66 which actuates the power unit connected with the damper vanes 22, and to the blower motor 24 as indicated by the similarly numbered block diagrams. Other cut-off valves or switches, not indicated, shut down the conveyor system supplying material to the dehydrator.

Operation of the control means is as follows:

Under conditions of normal operation, the motor load regulator 62 maintains the blower motor 24 under constant load by adjusting the position of the damper vanes 22. As a consequence, the air-vapor mass passing through the blower remains constant. Also, under normal conditions, the controllers 41, 44, 46, 50, 54 and 58 function collectively to maintain the furnace temperature at a constant value. As a consequence, the only variables are the rate at which the material is fed to the dehydrator and the moisture content of the material delivered to the dehydrator.

Under these conditions, the primary control is accomplished by the material discharge temperature sensor 32 which through the controller 34 causes the rate of feed to increase with increase in the temperature of the material discharging from the dehydrator, and to decrease when the discharging temperature decreases.

This control alone is not sufficient, therefore, the air discharge temperature sensor 33 operates through the secondary controller 37 to supplement the signal from the material discharge sensor 32. This is accomplished by inverting the signal from the sensor 33 and applying the inverted signal in opposition to the signal from the sensor 32 in the controller 34. Also, the secondary controller 37 provides a convenient means for manually adjusting the effect of the sensor 33. This has the effect of altering the temperature of the discharging material. Inasmuch as the temperature of the discharging material is a function of its moisture content, the regulator 39 actually functions as a means for adjusting the moisture content of the discharging material.

Should the air discharge temperature continue to climb, as would be the case when the supply of material is exhausted, the responder 54 and pressure selector 58 operate to cause the primary furnace temperature controller 46 to reduce the supply of fuel to the burner until the temperature of the discharging air reaches equilibrium.

Stated otherwise, the rate of feed demanded by the control system exceeds the capacity of the feeder 6, the furnace temperature will be reduced automatically. This reduction will continue until the maximum rate of feed is no longer required to maintain discharge temperatures and product moisture at the desired level.

It should be understood, however, that under ordinary operating conditions, the furnace temperature remains constant. It is only when a predetermined range of discharge air temperature is exceeded that the furnace burner is adjusted accordingly.

The furnace burner controller also functions during the start-up period and during the shut-down period.

Many materials which may be subjected to dehydration, alfalfa for example, are made increasingly combustible by dehydration. Therefore, there is the ever present danger that should the control system fail, combustion will occur in the drying or dehydrating drum, or in the separting chamber. The combustion is, of course, aggravated by the flow of air. The damage can be reduced to minor charring of a relatively small quantity of the material, by sensing an incipient rise in the air-water vapor discharge temperature. When this condition is sensed, the relay 67 is actuated to cause the valves or switches 68, 69 and 70, as well as the motors feeding the material to the dehydrator to close so that the oxygen needed for combustion is shut off along with the heat from the burner.

The method of controlling the dehydrator consists essentially in maintaining a uniform furnace temperature and uniform air mass discharge. In this regard, it should be noted that the discharging gas is not air alone, but includes also the water vapor extracted from the material being dehydrated. And, it should be noted that due to the changes in temperature, and due to the variation in the amount of entrained water vapor, the density of the gas which exits from the separator varies, and it is a mass of the gaseous discharge not the volume which is sensed by sensing the load on the blower motor.

Having as preliminary steps maintained constant, the heat input, and the discharge of the gaseous mass, the next step consists in sensing the discharge temperatures of the air and material and utilizing the signal thus obtained to control the rate of supply of new material so that the supply is increased to decrease the discharge temperatures and is decreased to increase the discharge temperatures. In other words, this step consists in utilizing the moisture content of the material being treated as a control of the discharge temperatures, and hence the moisture content of the dehydrated product.

The method thus described suffices as long as the variations in the rate of supply of the material, and the moisture content of the material are within the conditions imposed by the material temperature sensor and the air-water vapor discharge temperature. Beyond these conditions the method includes the further step of lowering the input of fuel so that the supply of material will reduce the temperatures of the discharging air and material so that the preceeding steps of controlling the feed rate of material by the air discharge temperature sensor and the material discharge temperature may be used.

Finally, the method envisions an emergency step characterized by sensing excessive rise in the air-water vapor temperature and applying the signal thus obtained to not only stop the flow of air through the dehydrator, but to shut off the fuel supply.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. A method of controlling a dehydrating apparatus which receives, continuously, material of varying moisture content from a variable drive feeder, exposes the material to hot air from a furnace, delivers the air and material to a separator and then separately discharges the air and dehydrated material; said method characterized by:
    (a) maintaining the heat output from said furnace at an essentially constant rate;
    (b) maintaining the air mass discharge from said separator at an essentially constant rate;
    (c) and increasing or decreasing the supply of said material in accordance with its moisture content to maintain the discharge temperature of said air and material within a preset range.
2. A method, as defined in claim 1 wherein:
    (a) the output from said furnace is altered when the discharge temperatures of the air and material exceed a preset range and a new preset range is established in which the furance output is maintained.
3. A control means for dehydrating apparatus wherein the dehydrating apparatus includes a feeder for a supply of material to be dehydrated; a variable speed drive for said feeder; a rotatable dehydrating drum having an inlet end to receive said material; a furnace at said inlet; a separator at the outlet end of said drum; a blower and damper for controlling the flow of air from the upper side of said separator; and means for discharging dehydrated material from the lower side of said separator; said control means comprising:
    (a) a material discharge temperature sensor;
    (b) a primary controller for said variable speed drive arranged to receive an input signal from said material discharge sensor;
    (c) an air discharge temperature sensor;
    (d) a secondary controller for said variable speed drive arranged to receive an input signal from said air discharge temperature sensor and impart a modifying signal to said primary controller;
    (e) said controllers operable to vary said feeder drive to increase the flow of material into said dehydrating drum in response to increase in the temperatures of the material and air discharging from said separator and to decrease the feed of said material on decrease in said temperatures.
4. A control means, as defined in claim 3, which further comprises:
    (a) furnace temperature controller tending to maintain said furnace at a predetermined heat output;
    (b) air flow controller tending to maintain the discharge of air through said blower at a constant rate.
5. A control means, as defined in claim 4, wherein:
    (a) said air flow controller is responsive to the load on said blower and includes a positioner for said damper thereby to maintain a uniform mass flow of air through said blower.
6. A control means, as defined in claim 4, which further comprises:
    (a) means responsive to change in the temperatures of discharging air and material beyond a preset limit for modifying said furnace temperature controller.
7. A control means, as defined in claim 4, which further comprises:
    (a) shut off means for said furance, damper and material discharge means;
    (b) and means responsive to rise in the temperature of discharging air above a preset limit for operating said shut off means.
8. A control means, as defined in claim 3, which further comprises:
    (a) a manual means for altering the modifying signal from said secondary controller to said primary controller thereby to effect change in the feed rate of material and cause a corresponding change in the discharge temperature and moisture content of said material.
9. A control means, as defined in claim 3, which further comprises:
    (a) a furnace temperature controller;
    (b) means responsive to an output signal from said primary feeder drive controller to modify said signal and feed said modified signal to said furnace temperature controller;
    (c) a furance temperature sensor;
    (d) means responsive to signals from said furnace temperature sensor and said air discharge temperature sensor to produce a modified signal and feed said signal to said furnace temperature controller;
    (e) both of said signal modifying means cooperating to maintain a fixed heat output from said furnace within a preselected temperature range of said air and material discharge sensors.
10. A control means for dehydrating apparatus wherein the dehydrating apparatus includes a feeder for a supply of material to be dehydrated; a variable speed drive for said feeder; a rotatable dehydrating drum having an inlet end to receive said material; a furnace at said inlet; a separator at the outlet end of said drum; a blower and damper for controlling the flow of air from the upper side of said separator; and means for discharging dehydrated material from the lower side of said separator; said control means comprising:
(a) means for maintaining the heat output of said furnace at an essentially constant value;
(b) means for maintaining the air mass passing through said blower at an essentially constant value;
(c) means for sensing the temperatures of air and dehydrated material discharging from said separator;
(d) and means for changing the rate of feed of said material in response to change in said discharge temperatures.

References Cited

UNITED STATES PATENTS

| 952,775 | 3/1910 | Whitlatch | 34—54 |
| 2,092,657 | 9/1937 | Smith. | |
| 3,102,794 | 9/1963 | Arnold | 34—52 XR |
| 3,302,937 | 2/1967 | Pixley. | |

FOREIGN PATENTS 1,206,771  12/1965  Germany.

FREDERICK L. MATTESON, JR., *Primary Examiner.*

A. D. HERRMANN, *Assistant Examiner.*